3,025,292
REDUCTION OF 1,2,4-BENZOTHIADIAZINE-1,1-DIOXIDES

William H. Jones, Metuchen, N.J., and Frederick C. Novello, Lansdale, Pa., assignors to Merck & Co., Inc., Rahway, N.J., a corporation of New Jersey
No Drawing. Filed Nov. 26, 1958, Ser. No. 776,402
3 Claims. (Cl. 260—243)

This invention is concerned with a novel process for the preparation of 3,4-dihydro-1,2,4-benzothiadiazine-1,1-dioxides. In particular, this invention relates to the preparation of the 3,4-dihydrobenzothiadiazine-1,1-dioxides by the reduction of a 1,2,4-benzothiadiazine-1,1-dioxide compound.

Previous workers in this field have reported an attempt to reduce 1,2,4-benzothiadiazines to the corresponding 3,4-dihydro-1,2,4-benzothiadiazine by catalytic reduction in the presence of palladium on a charcoal catalyst. This reduction did not prove to be feasible even on a laboratory scale as only a trace of the 3,4-dihydro-1,2,4-benzothiadiazine was obtained. It was surprisingly found as a feature of this invention, however, that when ruthenium is employed as a catalyst in the reduction of a 1,2,4-benzothiadiazine-1,1-dioxide, reduction readily occurs and high yields, in the order of 83% or more, of the desired 3,4-dihydro product are obtained.

In accordance with the process of this invention, the 1,2,4-benzothiadiazine-1,1-dioxide is hydrogenated in the presence of a ruthenium catalyst to form the desired 3,4-dihydro-1,2,4-benzothiadiazine - 1,1 - dioxide compound. This process can be employed to reduce any 1,2,4-benzothiadiazine whether unsubstituted or having one or more substituents attached to either the heterocyclic moiety or the benzenoid moiety of the benzothiadiazine ring structure. Of course, should the substituents themselves be of a type which would also undergo reduction during the process, this would not at all interfer with the saturation of the heterocyclic portion of the benzothiadiazine nucleus, and both the nucleus and the substituent group will undergo reduction provided the reduction is continued until sufficient hydrogen is absorbed.

While it is important that ruthenium be employed as a catalyst in the reduction process of this invention in order to obtain commercially feasible yields of the dihydro product, it can be used in any of its active forms. For example, activated ruthenium, such as ruthenium dioxide, can be employed as the catalyst, or the ruthenium can be adsorbed on activated carbon such as charcoal, lampblack, and the like, or the ruthenium can be adsorbed on aluminum or silica gel or other conventional carriers. The quantity of ruthenium employed is advantageously about 5% of the weight of the benzothiadiazine starting material, although more or less ruthenium can be used if desired.

Reduction advantageously is carried out in the presence of a solvent such as an alcohol, for example methanol or ethanol, or in the presence of some other solvent as 1,2-dimethoxyethane, tetrahydrofuran, dioxane, and the like, and at a temperature up to the decomposition point of the benzothiadiazine starting material. For all practical purposes, reduction generally is carried out at room temperature although the rate of reduction can be accelerated by increasing the temperature up to about 150° C.

While it is not critical to carry out the reduction at any particular pressure, generally it is carried out at atmospheric pressure although pressures up to a hundred atmospheres could be used to accelerate the rate of reduction.

Following the reduction, the reaction mixture can be worked up in any of the conventional ways to separate the 3,4-dihydro-1,2,4-benzothiadiazine - 1,1 - dioxide compound from the catalyst and solvent. A practical method for separating the dihydro compound which provides an excellent means for separating the end product quantitatively involves heating the reaction mixture to its boiling point and then removing the catalyst by filtration. To ensure that none of the dihydro compound remains on the filter with the catalyst, the solid material can be washed with one of the above identified solvents and all filtrates then combined and concentrated to precipitate the 3,4-dihydro-1,2,4-benzothiadiazine - 1,1 - dioxide compound.

The process of this invention has been found to be especially well suited to the preparation of 3,4-dihydro-1,2,4-benzothiadiazines which contain one sulfamyl substituent attached to the benzenoid moiety of the nucleus and which additionally contain at least one other substituent such as a halogen, a halogen-like radical or an alkyl, alkoxy, nitro, amino, or similar radical attached to the benzenoid portion of the nucleus. Substituents also can be attached to positions 2 or 4 and also to position 3 of the benzothiadiazine nucleus without interferring with the reduction process of this invention. The reduction process of this invention can be successfully carried out with all of the aforementioned compounds to saturate the double bond in the heterocyclic moiety of the benzothiadiazine compound to yield the desired 3,4-dihydro-1,2,4-benzothiadiazine-1,1-dioxide compound.

The 3,4 - dihydro - 1,2,4 - benzothiadiazine-1,1-dioxide compounds prepared by the reduction process of this invention which contain a sulfamyl substituent and at least one other substituent attached to the benzenoid portion of the structure are useful, inter alia, as diuretic and/or saluretic agents. Among this group of compounds, those possessing an especially high order of effectiveness are compounds having the following general structure

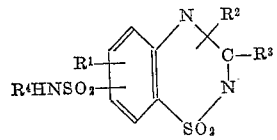

wherein $R^1$ represents halogen or a halogen-like radical as chlorine, bromine, fluorine, trihalomethyl as trifluoromethyl, trichloromethyl and the like, a lower alkyl radical having 1 to 5 carbon atoms, a lower alkoxy radical having 1 to 5 carbon atoms, or an amino group; $R^2$ is attached to either the 2- or 4-position nitrogen atom and is hydrogen or a lower alkyl radical having 1 to 5 carbon atoms; $R^3$ is hydrogen or an alkyl radical having 1 to 11 carbon atoms and either unsubstituted or substituted as a haloalkyl for example trifluoromethyl, trichloromethyl, and the like, or it can be a phenyl or a benzyl radical; and $R^4$ represents hydrogen or a lower alkyl radical having from 1 to 5 carbon atoms which can be substituted or unsubstituted, containing for example, an hydroxy group attached to one of the carbons of the alkyl chain.

While the foregoing structure illustrates a group of compounds which can be prepared by the process of this invention, the novel process described herein can be employed to reduce any 1,2,4-benzothiadiazine-1,1-dioxide compound to give a 3,4-dihydro-1,2,4-benzothiadiazine-1,1-dioxide.

The process of this invention is more fully described in the following examples. It is to be understood, however, that the examples are illustrative of the various compounds that can be prepared by the process of this invention and of the various conditions under which the reduction can be successfully carried out, and they are not to be construed as limiting the invention to the preparation of the particular compounds specifically described or to the particular conditions employed, it being critical only that ruthenium be used as the reduction catalyst to provide high yields of the desired dihydro compound.

*Example 1*

Three grams of 6-chloro-7-sulfamyl-1,2,4-benzothiadiazine-1,1-dioxide is suspended in 100 ml. of methanol. Then 1.0 g. of a 5% ruthenium on charcoal catalyst is added, and the mixture is reduced at room temperature and at an initial hydrogen pressure of 39 p.s.i.g. (pounds per square inch, gauge pressure). The theoretical amount of hydrogen to form the 3,4-dihydro derivative is absorbed after a period of about 10 hours.

The reduction mixture then is heated to boiling and filtered hot to remove the catalyst. The catalyst is washed with a little methanol and the combined filtrate is concentrated to a volume of about 25 ml. by evaporation on a steam bath. Upon cooling to room temperature, white crystals separate which are filtered, washed with water, and dried in vacuo at room temperature over phosphorus pentoxide overnight. The weight of 6-chloro-7-sulfamyl-3,4-dihydro-1,2,4-benzothiadiazine-1,1-dioxide obtained is 1.26 g.; M.P. 268.5–270° C. Dilution of the above filtrate with water to a volume of about 125 ml. gives a second crop of product having the same melting point and weighing 1.22 g., giving a combined yield of 83%. When the product is mixed with an authentic sample of 6-chloro-7-sulfamyl-3,4-dihydro-1,2,4-benzothiadiazine-1,1-dioxide, prepared by another method, the melting point is not depressed.

*Example 2*

A suspension of 6-methyl-7-sulfamyl-1,2,4-benzothiadiazine-1,1-dioxide (5 grams) in 100 ml. of tetrahydrofuran is shaken in an atmosphere of hydrogen in the presence of 100 mg. of ruthenium dioxide at atmospheric pressure at 50° C. until the theoretical quantity of hydrogen required for saturation of the double bond is absorbed.

The reduction mixture then is heated to boiling and filtered hot to remove the catalyst. The catalyst is washed with a little tetrahydrofuran and the combined filtrate is concentrated to dryness in vacuo. Recrystallization of the residue from alcohol-water gives 6-methyl-7-sulfamyl-3,4-dihydro-1,2,4-benzothiadiazine-1,1-dioxide.

*Example 3*

Three grams of 4-allyl-6-chloro-7-sulfamyl-1,2,4-benzothiadiazine is suspended in 100 ml. of dioxane. One gram of a 5% ruthenium on aluminum catalyst then is added and the mixture reduced at room temperature and at atmospheric pressure until two molecular equivalents of hydrogen are absorbed.

The reduction mixture is heated to boiling and filtered hot to remove the catalyst. The catalyst is washed with a small quantity of dioxane and the combined filtrates concentrated to dryness in vacuo. Recrystallization of the residue from alcohol-water gives 4-propyl-6-chloro-7-sulfamyl-1,2,4-benzothiadiazine-1,1-dioxide.

While the above examples illustrate specific conditions for the reduction of 1,2,4-benzothiadiazine-1,1-dioxide compounds to give 3,4-dihydro derivatives thereof, it is to be understood modifications can be made in the reaction conditions described in the examples without departing from the scope of the invention as defined by the appended claims.

What is claimed is:

1. A process wherein the heterocyclic moiety of 1,2,4-benzothiadiazine-1,1-dioxide is reduced catalytically in the presence of ruthenium at a temperature between about room temperature and about 50° C. and at a pressure between about 1 atmosphere to about 100 atmospheres to give the corresponding 3,4-dihydro-1,2,4-benzothiadiazine-1,1-dioxide.

2. A process wherein the heterocyclic moiety of 1,2,4-benzothiadiazine-1,1-dioxide is reduced catalytically in the presence of ruthenium on charcoal at a temperature between about room temperature and about 50° C. and at a pressure between about 1 atmosphere to about 100 atmospheres to give the corresponding 3,4-dihydro-1,2,4-benzothiadiazine-1,1-dioxide.

3. A process wherein 6-chloro-7-sulfamyl-1,2,4-benzothiadiazine-1,1-dioxide is reduced catalytically in the presence of ruthenium on charcoal at a temperature between about room temperature and about 50° C. and at a pressure between about 1 atmosphere to about 100 atmospheres to give 6-chloro-7-sulfamyl-3,4-dihydro-1,2,4-benzothiadiazine-1,1-dioxide.

References Cited in the file of this patent

UNITED STATES PATENTS

| 2,606,924 | Whitman | Aug. 12, 1952 |
| 2,606,925 | Whitman | Aug. 12, 1952 |
| 2,606,926 | Kirby | Aug. 12, 1952 |

OTHER REFERENCES

Gilman et al.: Advances in Catalysis, vol. IX, pp. 733–742 (1957).